Patented Feb. 19, 1952

2,585,998

UNITED STATES PATENT OFFICE 2,585,998

METHOD OF PREPARING 7-HALOGEN STEROL ESTERS

Jan Anne Keverling Buisman, Eindhoven, Netherlands, assignor to Hartford National Bank and Trust Company, Hartford, Conn., trustee No Drawing. Application July 16, 1947, Serial No. 761,413. In the Netherlands July 10, 1946

2 Claims. (Cl. 260—397.2)

As is well-known, 7-dehydrosterols, more particularly 7-dehydrocholesterol, may be prepared by esterifying a 7-hydroxysterol-3-monoderivative followed by thermal decomposition of the ester.

According to the invention, a 7-hydroxysterol-3-monoester is converted, by the action of a suitable halogen compound, into a 7-halogensterolester from which, as is known in itself, hydrohalogen can be split off.

Bromine is preferably utilised as the halogen whilst the invention and also the first-mentioned method are particularly important for the preparation of 7-bromocholesterol esters, 7-dehydrocholesterolesters and eventually 7-dehydrocholesterol apt to be converted into vitamin-D by irradiation with ultra-violet light.

For converting 7-hydroxysterolester into 7-bromosterolester use is made, according to one particular mode of realisation, of phosphorus tribromide which has been found to be very suitable for this purpose.

According to the invention, it is possible to prepare 7-α-halogensterolesters or 7-β-halogensterolesters.

Example 0.68 gr. of 7-α-hydroxycholesterol-3-benzoate is introduced, together with 2 cm.³ of pyridine and 20 cm.³ of absolute ether, into a flask provided with a dropping funnel and a calcium chloride tube. In the course of a few minutes 1.14 grs. of phosphorus tribromide dissolved in 5 cm.³ of absolute ether are added. A white deposit is formed in the flask and only little heat is developed. After letting it stand for one night ether and water are added, owing to which the larger proportion of the deposit dissolves; there remains a gelatinous intermediate layer which is neglected. The water layer is once more shaken out with ether, the ether layers being subsequently together shaken out with water. After drying the ether layer is distilled in vacuo. After the residue has been dried in vacuo above sulphuric acid for the purpose of removing the pyridine the colourless residue has a weight of 0.59 gr. After the product has been recrystalliesed a few times from acetone, we obtain 0.1 gr. of pure 7-α-bromocholesterol-benzoate, colourless needles melting at 138–139° C., decomposing at 140° C. and containing the correct contents of bromine.

Heating for 10 minutes in an atmosphere of nitrogen in the presence of dimethylaniline causes conversion into 7-dehydrocholesterol benzoate.

7-α-hydroxycholesterol-3-benzoate is obtained from 7-α-hydroxycholesterol prepared by saponification of 7-α-hydroxycholesterol-dibenzoate having a melting point of 171–172° C. (prepared according to Windaus c. s., Annalen der Chemie, 520 98, 1935). The 7-α-hydroxycholesterol is partially esterified by boiling it for 6 hours in a benzene solution together with the same quantity by weight of benzoic anhydride. After the benzene has been removed by distillation and after the residue has been crystallized from alcohol we obtain 1.4 grs. 7-α-hydroxycholesterol-3-benzoate in colourless needles with a melting point of 191½–192½° C.

Starting from 7-β-hydroxycholesterol-3-benzoate, melting point 165–166° C., we obtain 7-β-bromocholesterol-3-benzoate in colourless crystals with a melting point of 132–133° C. above which decomposition occurs.

Other 7-halogensterolesters may also be prepared in similar ways.

What I claim is:

1. The process of preparing 7-bromosterolesters comprising the step of subjecting a 7-β-hydroxycholesterol-3-monoester to the action of phosphorus tribromide without bromine addition at the 3-position, and thereby converting the 7-β-hydroxycholesterol-3-monoester to the corresponding 7-β-bromosterolester.

2. The process of preparing a 7-bromosterolester comprising the step of subjecting 7-β-hydroxycholesterol-3-benzoate to the action of phosphorus tribromide without bromine addition at the 3-position, and thereby converting the 7-β-hydroxycholesterol-3-benzoate to 7-β-bromosterol benzoate.

JAN ANNE KEVERLING BUISMAN.

REFERENCES CITED

The following references are of record in the file of this patent:

UNITED STATES PATENTS

| Number | Name | Date |
|---|---|---|
| 2,098,984 | Windaus | Nov. 16, 1937 |
| 2,215,727 | Rosenberg | Sept. 24, 1940 |
| 2,395,232 | Meuly | Feb. 19, 1946 |

FOREIGN PATENTS

| Number | Country | Date |
|---|---|---|
| 574,432 | Great Britain | Jan. 4, 1946 |

OTHER REFERENCES

Marker: "Jour. Am. Chem. Soc.," vol. 52, pp. 481–482 (1936).

Wintersteiner et al.: Jour. Am. Chem. Soc. 65, 1503–1507 (1943).